United States Patent
Potty et al.

(10) Patent No.: US 8,981,821 B2
(45) Date of Patent: Mar. 17, 2015

(54) INTERFERENCE MITIGATION OUTPUT FREQUENCY DETERMINED BY DIVISION FACTORS SELECTED RANDOMLY

(71) Applicant: Texas Instruments Incorporated, Dallas, TX (US)

(72) Inventors: Sreenath Narayanan Potty, Bangalore (IN); Jasbir Singh Nayyar, Bangalore (IN); Vivek Singhal, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/739,256

(22) Filed: Jan. 11, 2013

(65) Prior Publication Data

US 2014/0197875 A1    Jul. 17, 2014

(51) Int. Cl.
*H03B 19/00* (2006.01)
*G06F 1/04* (2006.01)

(52) U.S. Cl.
CPC ........................................ *G06F 1/04* (2013.01)
USPC ............................ 327/113; 327/117; 327/118

(58) Field of Classification Search
CPC ...... H03L 7/081; H03L 7/0814; H03L 7/0816
USPC .......................................... 327/113, 117, 118
See application file for complete search history.

(56) References Cited

U.S. PATENT DOCUMENTS 6,509,800 B2 *    1/2003    Stockton ......................... 331/11

* cited by examiner

*Primary Examiner* — John Poos
(74) *Attorney, Agent, or Firm* — Lawrence J. Bassuk; Frank D. Cimino

(57) ABSTRACT

Several methods and circuits configured to mitigate signal interference of at least one aggressor circuit operable on a first clock signal within an interfering frequency range of at least one victim circuit in an IC are disclosed. In an embodiment, a signal interference mitigation circuit is configured to be associated with the aggressor circuit and includes a clock divider circuit and a control circuit. The clock divider circuit is configured to generate the first clock signal based on a second clock signal and a division factor pattern. The control circuit is coupled with the clock divider circuit and configured to determine the division factor pattern and provide the division factor pattern to the clock divider circuit. The division factor pattern comprises a plurality of division factors selected randomly based on a plurality of random numbers, and is configured to control a throughput frequency associated with the signal interference mitigation circuit.

13 Claims, 6 Drawing Sheets

INTERFERENCE MITIGATION OUTPUT FREQUENCY DETERMINED BY DIVISION FACTORS SELECTED RANDOMLY

TECHNICAL FIELD

The present disclosure generally relates to signal interference mitigation.

BACKGROUND

In accordance with an exemplary scenario, several multi-radio systems-on-chip (SoCs) include multiple on-chip radio frequency (RF) circuits that coexist and operate on a single silicon die. Such SoCs include digital, as well as analog, circuits integrated on the same silicon die. For example, a SoC may be designed to accommodate Wireless Local Area Network (WLAN) systems, short range wireless communication systems, and Frequency Modulation (FM) radio systems thereon.

In various exemplary scenarios, the RF circuits coexisting on the SoC may cause interference issues in efficient operation of the SoCs. For example, the digital circuits in the SoC may significantly contribute to the interference when the harmonics of the frequencies of a digital clock signal associated with the digital circuits fall in a band of interest of RF circuits. As such, the RF circuits may not function as expected. In various exemplary scenarios, such harmonics of the frequencies of the digital clock signals are referred to as spurs or spurious signal. If the spurs caused by digital activity happen to be in the band of interest of RF circuits on the SoC, they may cause degradation in the performance of RF circuits. For example, the spurs may change the noise floor, thereby impacting the detection of channel presence. In so much as the location of the interfering frequency band may be closely related to the digital clock frequency, choosing the digital clock frequency may be difficult.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

A number of exemplary circuits and methods for mitigating signal interference of at least one aggressor circuit, the aggressor circuit being capable of being operated on a first clock signal in an Integrated Circuit (IC), whose fundamental frequency or harmonics fall within an interfering frequency range of at least one victim circuit in the IC, are disclosed. The interfering frequency range may include the frequencies, the fundamental components or the harmonics of which lie in the frequency band of interest of the victim circuit and that may cause interference in operation of the victim circuit. For example, an operating frequency of 32 mega hertz (MHz) of an aggressor circuit may lie within an interfering frequency range of a victim circuit with a frequency band of 76-108 MHz, as a third harmonic of the 32 MHz, that is 96 MHz lies between 76 and 108 MHz.

In an embodiment, a signal interference mitigation circuit is disclosed that is configured to be communicatively coupled or associated with the at least one aggressor circuit. In an embodiment, the signal interference mitigation circuit includes a clock divider circuit and a control circuit. The clock divider circuit is configured to generate the first clock signal based on a second clock signal and a division factor pattern. The control circuit is communicatively coupled or associated with the clock divider circuit. The control circuit is configured to determine the division factor pattern, wherein the division factor pattern comprises a plurality of division factors selected randomly based on a plurality of random numbers. The division factor pattern is determined in a manner so as to control a throughput frequency associated with the signal interference mitigation circuit. The control circuit is further configured to provide the division factor pattern to the clock divider circuit.

Additionally, in an embodiment, an IC configured to mitigate signal interference is disclosed. The IC includes at least one aggressor circuit, a victim circuit, and a signal interference mitigation circuit. The victim circuit operates in a predetermined frequency range. The aggressor circuit is capable of being operated on a first clock signal within an interfering frequency range of the victim circuit. In an embodiment, the signal interference mitigation circuit is communicatively coupled or associated with the at least one aggressor circuit. The signal interference mitigation circuit includes a clock divider circuit and a control circuit. The clock divider circuit is configured to generate the first clock signal based on a second clock signal and a division factor pattern. The control circuit is communicatively coupled or associated with the clock divider circuit. The control circuit is configured to determine the division factor pattern, wherein the division factor pattern comprises a plurality of division factors selected randomly based on a plurality of random numbers. The division factor pattern is determined in a manner so as to control a throughput frequency associated with the signal interference mitigation circuit. The control circuit is further configured to provide the division factor pattern to the clock divider circuit.

Moreover in an embodiment, a method of mitigating signal interference of at least one aggressor circuit is disclosed. In an embodiment, at least one aggressor circuit is capable of being operated on a first clock signal in an IC within an interfering frequency range of at least one victim circuit in the IC. The method at a signal interference mitigation circuit for the at least one aggressor circuit comprises generating a second clock signal. The method further includes determining a division factor pattern for driving the second clock signal. The division factor pattern comprises a plurality of division factors selected randomly based on a plurality of random numbers. The division factor pattern is determined in a manner so as to control a throughput frequency of the signal interference mitigation circuit. Furthermore, the method includes generating the first clock signal based on a division of the second clock signal by the plurality of division factors according to the division factor pattern.

Other aspects and exemplary embodiments are provided in the drawings and the detailed description that follows.

The drawings referred to in this description are not to be understood as being drawn to scale except if specifically noted, and such drawings are only exemplary in nature.

DETAILED DESCRIPTION

Pursuant to an exemplary scenario, multi-radio systems on chip (SoCs) include multiple on-chip radio frequency (RF) circuits including analog and digital components that are to coexist and operate successfully on a single silicon die. The RF circuit in a multiple radio SoC is prone to interference. It is found that a digital circuit in the SoC significantly contributes to the interference. If any of the harmonics of the frequencies of a digital clock signal (of the digital circuit) lie in any of the RE frequency band of interest, this will interfere with the RF signal and the circuit may not function as expected. Also, in such multi-radio SOCs when the harmonics of the frequencies of the digital clock signal associated with an aggressor block includes spurs, the interference caused may become accentuated and result in a significant performance degradation of a RE circuit associated with a victim block in the SoC.

Figure 1A:
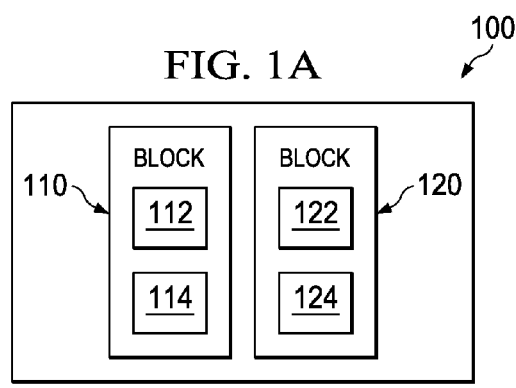
FIG. 1A is a block diagram of an exemplary integrated circuit (IC) in a multi-radio system on chip in accordance with an exemplary scenario.
Figure 1B:
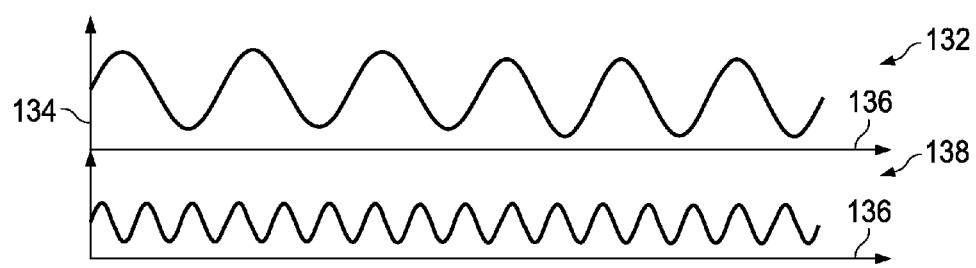
FIG. 1B depicts exemplary waveforms of clock signals associated with the IC of FIG. 1A in accordance with an exemplary scenario.

An explanation of this phenomenon will now be provided with reference to FIGS. 1A and 1B, wherein FIG. 1A depicts an exemplary representation of an IC 100 including a block 110 and a block 120. The blocks 110 and 120 may be any Intellectual Property (IP) blocks or circuit combinations for specific components pertaining to, but not limited to, short range wireless communications, Wireless Local Area Network (WLAN), Frequency Modulation (FM) radio and Global Positioning System (GPS) technologies. Each of the blocks 110 and 120 may include digital and/or analog components. For example, the block 110 may include an analog circuit 112 and a digital circuit 114 for a GPS device or subsystem, and the block 120 may include an analog circuit 122 and a digital circuit 124 for a FM radio.

In accordance with one exemplary scenario, the digital circuit 114 for the GPS operates at a clock frequency of 32 megahertz (MHz). Exemplary clock waveforms associated with the digital circuit 114 are illustrated in FIG. 1B. For example, FIG. 1B illustrates a plot 132 between a clock signal amplitude 134 (plotted along y-axis) and time 136 (plotted along x-axis). Although clock signals are typically depicted as square waves, they may be expressed as summation of sinusoids of fundamental frequency and harmonics of the square waves. Accordingly, the plot 132 depicted in FIG. 1B is a sinusoid associated with for example, the clock signal of 32 MHz associated with the GPS circuit. In an example scenario, the analog circuit 122 for the FM radio operates at a frequency range of 76-108 MHz. However, due to periodic switching of the digital circuit 114 (associated with the GPS at 32 MHz), a third harmonic is induced through a power supply and/or ground network. The third harmonic centers around 96 MHz. For example, as illustrated in FIG. 1B, the third harmonic 138 is shown as a plot 136 between the clock signal amplitude plotted along y-axis 134 and time plotted along x-axis 136. The third harmonic frequency associated with the GPS circuit lies in the operating frequency range (76-108 MHz) of the analog circuit 122 for the FM radio. Accordingly, this third harmonic may interfere with analog circuit 122 associated with the FM radio and may result in de-sense for the FM radio. In such scenarios, a circuit, such as the digital circuit 114, may thereby be termed as an aggressor circuit, and an adjacent circuit, such as the analog circuit 122, may thereby be termed as a victim circuit. Examples of the aggressor and/or victim circuits may include, but are not limited to, a global positioning system circuit, a frequency modulation circuit, a short range wireless communications circuit, a wireless local area network circuit, and a near field communication circuit.

Figure 1C:
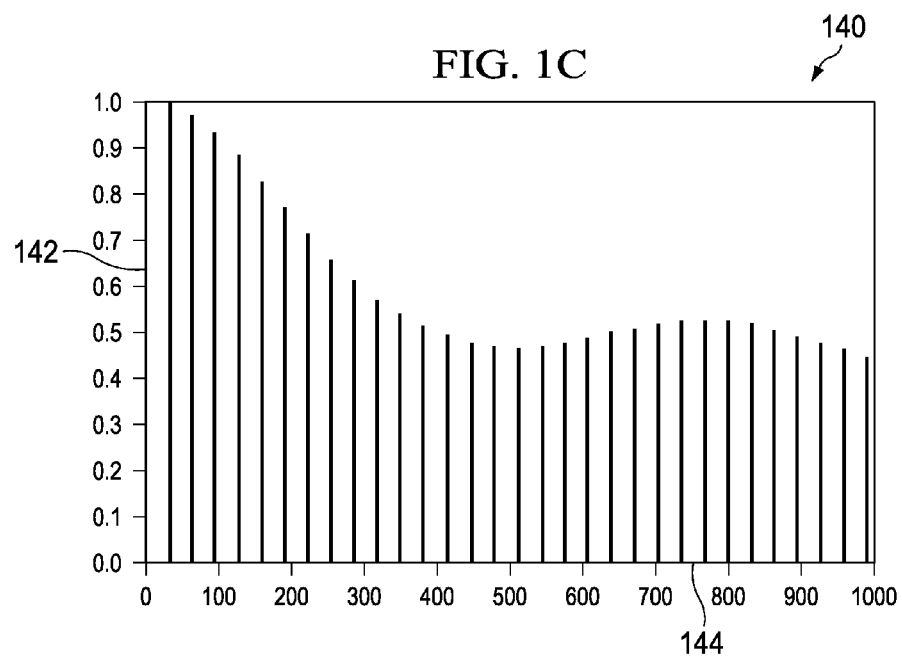
FIG. 1C depicts an exemplary frequency profile of a clock signal associated with the IC of FIG. 1A in accordance with an exemplary scenario.

FIG. 1C depicts a frequency profile 140 of IC 100 of FIG. 1A operating at 32 MHz in accordance with an exemplary scenario. The frequency profile 140 is a plot of normalization power of the IC 100 plotted along y-axis 142 and frequency plotted along x-axis 144. The frequency profile 140 depicts spikes at various harmonics of the operating frequency of 32 MHz of the IC. The spikes at various harmonics constitute the spurs that may cause interference with the victim circuit, such as the analog circuit 122 of FIG. 1A, and may result in de-sense for the FM radio.

Several exemplary techniques may be employed to solve the problem of interference in the SoCs. In one such technique, namely, a clock edge dithering technique, multiple configurable delay elements are implemented in the circuit that may facilitate in the introduction of a jitter in a clock signal, thereby spreading a spectrum of power profile of the IC such as IC 100. However, due to introduction of multiple delay elements, the clock edge dithering technique results in additional complexity in the circuit. Moreover, due to the presence of delay elements, the clock edge dithering technique is process voltage and/or temperature dependant, thereby rendering the timing closure to be relatively difficult.

The present disclosure provides solutions to these and other problems, in addition to providing currently unavailable benefits. Various embodiments of the present technology provide a signal interference mitigation circuit configured to mitigate signal interference of at least one aggressor circuit in an IC, wherein the aggressor circuit is capable of being operated on a first clock signal within an interfering frequency range of at least one victim circuit in the IC. The signal interference mitigation circuit of the present technology is configured to generate first clock signals to be provided to the aggressor circuit, wherein the first clock signals are generated based on a random selection of a division factor from among a plurality of division factors. The signal interference mitigation circuits of various exemplary embodiments are described further herein with reference to FIGS. 2-6.

Figure 2:
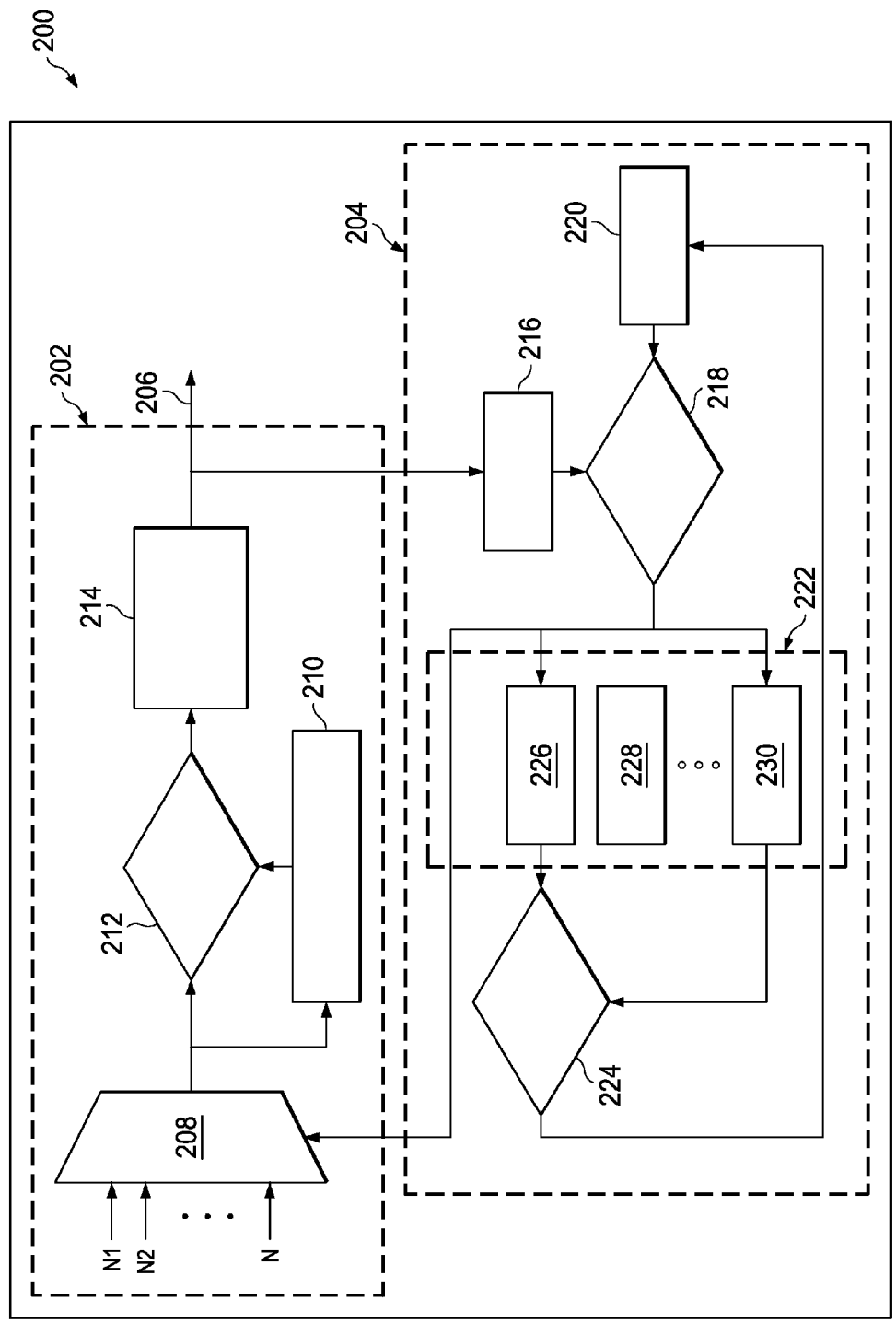
FIG. 2 illustrates a block diagram of an exemplary signal interference mitigation circuit in accordance with an embodiment.

FIG. 2 illustrates a block diagram of a signal interference mitigation circuit 200 that may be utilized in an IC, such as the IC 100, in order to mitigate various co-existence issues (for example, signal interference) associated with aggressor circuits and victim circuits in the IC according to an embodiment. The signal interference mitigation circuit 200 is configured to mitigate the co-existence issues based on a random selection of division factors associated with a division factor pattern so as to provide a first clock signal upon which an aggressor circuit may operate. In an embodiment, the division factor pattern comprises a plurality of division factors selected randomly based on a plurality of random numbers. In an embodiment, the division factor pattern is determined in a manner so as to control a throughput frequency associated with the signal interference mitigation circuit. As used herein, the term "throughput frequency" may be construed, for example, as referring to a minimum preselected clock rate of the first clock signal to be provided to an aggressor circuit over a specific time interval based on a parameter associated with an aggressor circuit. In an embodiment, the signal interference mitigation circuit 200 is communicatively coupled or associated with the aggressor circuit of the IC, such as IC 100, such that the first clock signal generated through the signal interference mitigation circuit 200 is provided to the aggressor circuit (e.g., for operational purposes).

In an embodiment, the signal interference mitigation circuit 200 includes a clock divider circuit 202 and a control circuit 204. The clock divider circuit 202 is configured to receive a selection of a division factor from among the plurality of division factors (for example, division factors $N_1$, $N_2$, and so on up to N, as depicted in FIG. 2) associated with the division factor pattern, and to generate a first clock signal 206 of a predetermined frequency based on a second clock signal and the division factor. In an embodiment, the second clock signal is a high-frequency clock signal. Also, each division factor from among the plurality of division factors is a positive integer. In an embodiment, the selected division factor may be utilized to divide the frequency of the first clock signal so as to generate a relatively lower frequency clock signal, which may be provided as an input to the at least one aggressor block. For example, if a desired throughput is 32 MHz and a second clock signal of root frequency 256 MHz is used, the division factor pattern may include a random sequence of division factors 7 and 9 that may randomly generate a first clock signal 206 of amplitude 256/7 MHz (for example, upon selection of 7 as the division factor) or 256/9 MHz (for example, upon selection of 9 as the division factor) thereby achieving a throughput of 32 MHz. The control circuit 204 is communicatively coupled or associated with the clock divider circuit 202. In an embodiment, the control circuit 204 is configured to determine the division factor pattern. In an embodiment, the selection of the division factor is performed such that the division factor is selected randomly based on the throughput frequency associated with the signal interference mitigation circuit. The random selection of the division factor from among the plurality of division factors enables the first clock signal 206 to randomly or non-periodically switch between the plurality of division factors, thereby mitigating the issues associated with periodic switching in the techniques described herein with reference to FIGS. 1A-1D. It is noted that the random selection of the division factors according to the division factor pattern has an advantage whereby a superposition of various possible patterns of division factor is enabled, thereby facilitating a distribution of the power across various frequencies and suppressing one or more harmonics associated with the aggressor frequency.

In an embodiment, the division factor is randomly selected based on the preselected throughput frequency. For example, if the preselected throughput frequency is 123 MHz, and if a second clock signal of root frequency of 800 MHz and 1000 clock cycles is implemented, then a division factor 6 may be selected for 500 clock cycles, thereby rendering the first clock signal 206 to assume a value of 133 MHz for 500 clock cycles. Additionally, a division factor 7 may be selected for the remaining 500 clock cycles, thereby rendering the first clock signal 206 to assume a value of 114 MHz for the remaining clock cycles. In this manner, the throughput frequency obtained would be an average frequency of 133 MHz and 114 MHz (123 MHz) with 50 percent (%) bias. As used herein, the term "bias" may be construed, for example, as referring to a probability, in terms of percentage, of selecting one or more division factors at a specific instant during the clock cycles of the first clock signal generated by the signal interference mitigation circuit 200 of FIG. 2. For example, a 50 percent bias for selection of division factors 6 and 7 may indicate that the number of times division factor 6 is selected is equal to the number of times the division factor 7 is to be selected. The bias enables the controlling of the randomness in the selection of the division factors so as to achieve a preselected throughput frequency.

In an embodiment, the clock divider circuit 202 includes a multiplexer circuit 208, a counter 210, a first comparator circuit 212, and a flip-flop circuit 214. In an embodiment, the multiplexer circuit 208 is configured to receive a selection signal from the control circuit 204 and provide a selection of a division factor based on the division factor pattern and the selection signal. An example of the multiplexer circuit 208 includes, but is not limited to, a digital multiplexer.

In an embodiment, the counter 210 is configured to receive the selection of the division factor and generate the second clock signal indicative of a count value based on the division factor. In an embodiment, the counter 210 is a high frequency counter. The first comparator circuit 212 is communicatively coupled or associated with the counter 210 and the multiplexer circuit 208. The first comparator circuit 212 is configured to compare the selection of the division factor output from the multiplexer circuit 208 with a count value associated with the counter 210 at the rate of the second clock signal and, in response, generate a trigger signal based on the comparison.

The flip-flop circuit 214 is communicatively coupled or associated with the first comparator circuit 212 and is configured to receive the trigger signal and generate the first clock signal 206 based on the division factor pattern. The trigger signal may include a set or reset input for the flip-flop circuit 214. An example of the flip-flop circuit 214 may include, but is not limited to, a Q flip-flop. The first clock signal is generated by the flip-flop circuit 214 based on the division factor such that the spur signal associated with the first clock signal is suppressed at the one or more operational frequencies associated with the aggressor circuit. As the first clock signal 206 is generated based on the division factor pattern that is randomly selected, the frequency profile of the first clock signal 206 is flat at lower frequencies. The random selection of the division factor pattern enables the spreading of energy across a frequency range below the root frequency or second clock frequency and thereby suppresses spur signals at one or more operational frequencies (primarily frequency below the root frequency).

In an embodiment, the control circuit 204 includes a random number generator circuit 216, a second comparator circuit 218, and a register 220. An example of the random number generator circuit 216 includes, but is not limited to, a linear feedback shift register (LFSR). The random number generator circuit 216 is clocked or actuated by the generated clock signal 206 and is configured to generate a random number upon being actuated. Each random number may correspond to an LFSR state. If the LFSR is, for example, a 10-bit LFSR, the LFSR may have 2 to the power of 10-1 (that is 1024−1=1023) states, and therefore, the LFSR may generate 1023 random numbers.

The register 220 is communicatively coupled or associated with the second comparator circuit 218 and is configured to store a value of a predetermined threshold. The second comparator circuit 218 is communicatively coupled or associated with the random number generator circuit 216 and the register 220. The second comparator circuit 218 is configured to compare the random number with a predetermined threshold in order to generate the selection signal. In an embodiment, the comparison may be performed for every clock cycle of the first clock signal. In another embodiment, the comparison may be performed after every "n" number of clock cycles of the first clock signal 206, where "n" may be a positive integer. The selection signal may be indicative of the selection of the division factor from among the plurality of division factors. In an embodiment, the value of the predetermined threshold in the register 220 is initially loaded by firmware. For example, if the random number generator circuit 216 is a 10-bit LFSR, then the random number generator circuit 216 may obtain 1023 (2 to the power of 10-1) logic states. If the value of the predetermined threshold is set to 511, during half of the instances, the LFSR state may be above 511, and, during the other half of the instances (for example, clock cycles), the LFSR state may be below 511. Based on whether the LFSR state is above or below 511 and an extent of deviation of the LFSR state from the predetermined threshold, during every instance (that may include each clock cycle or more than one clock cycle) a division factor may be selected from among the plurality of division factors.

For a bias of 50%, the last bit of the LFSR state may be compared with the predetermined threshold. Since the last bit of the LFSR state can either be at logic 0 or logic 1, for logic 0 a first division factor (for example, 7) may be selected and for logic 1 a second division factor (for example, 6) may be selected such that the first clock signal 206 is switched randomly between the divided versions corresponding to the first and the second division factors, and an average of the two divided versions (for example, 123 MHz for a root frequency of 800 MHz) may be the throughput frequency achieved corresponding to the bias of 50%. The second comparator circuit 218 may be configured to perform the comparison based on a predetermined criterion and/or logic. The bias is determined by the number of times each of the plurality of division factors is selected. In various embodiments and implementations, the random selection of the division factors may be biased in a manner to control the throughput frequency and to achieve a preselected throughout frequency.

In order to control the throughput frequency based on a number of times, one or more division factors from among the plurality of division factors are selected, and, in an embodiment, the control circuit 204 additionally includes a plurality of counter circuits 222 and a third comparator circuit 224 communicatively coupled or associated with the plurality of counter circuits 222 and the register 220. In the present embodiment, the register 220 may be an increment-decrement register. Each counter circuit from among the plurality of counter circuits 222 may be communicatively coupled or associated with the second comparator circuit 218. Each counter circuit from among the plurality of counter circuits 222 may correspond to one of the plurality of division factors and may be configured to count the number of times that the corresponding division factor is selected. For example, a first counter circuit 226 may be configured to count the number of times a division factor N is selected, a second counter 228 may be configured to count the number of times a division factor $N_2$ is selected, and, similarly, an nth counter 230 may be configured to count the number of times that a division factor N is selected. Each of the plurality of counter circuits 222 may be configured to receive the selection signal from the second comparator circuit 218 and to count the selection of the corresponding one of the plurality of division factors based on the selection signal. In an embodiment, the plurality of counter circuits 222 may additionally include a counter circuit configured to count a number of clock cycles of at least one of the first clock signal 206 and the second clock signal. The counter circuit enables determination of a throughput at a given instance based on computation of a number of clock edges of the first clock signal 206 corresponding to a predetermined number of clock edges of the second clock signal.

The third comparator circuit 224 is communicatively coupled or associated with the plurality of counter circuits 222 and the register 220. The third comparator circuit 224 is configured to compare a plurality of counts associated with one or more of the plurality of counter circuits 222 based on a predetermined criterion so as to adjust the predetermined threshold in the register 220 based on the comparison. For example, in an embodiment, the predetermined criterion may be associated with the throughput frequency of the clock divider circuit 202. For example, it may be assumed that the preselected throughput frequency is 125 MHz, the random number generator circuit 216 is a 10-bit LFSR, and an initial value of the predetermined threshold is 511. In such a scenario, for instances when the LFSR state is above 511, a first division factor, such as, for example, 6, is chosen, thereby generating a 133 MHz clock signal, and, for the other instances, a second division factor, such as, for example, 7, is chosen, thereby generating a 114 MHz clock signal. The throughout frequency consequently achieved as an average of 133 MHz and 114 MHz (if a root frequency of 800 MHz is used) is 123 MHz. The throughput frequency achieved is less than the preselected throughput frequency of 125 MHz. In order to achieve the preselected throughout frequency of 125 MHz, the value of the predetermined threshold in the register 220 is decremented. If the LFSR state is greater than or equal to the decremented value of the predetermined threshold, then the division factor 6 is chosen; otherwise the division factor 7 is chosen. Therefore, in order to achieve the throughput frequency to 125 MHz, the value of the predetermined threshold is either incremented or decremented such that the number of times the division factor 6 is chosen will be more than the number of times the division factor 7 is chosen. Since the third comparator circuit 224 is configured to compare and thereby monitor the number of times that the division factors 6 and 7 are selected, based on the comparison, the value of the predetermined threshold in the register 220 is either increased or decreased to thereby achieve the preselected throughput frequency.

The predetermined criterion for performing the comparison through the third comparator circuit 224 may be adjusted so as to achieve the preselected throughput frequency. In an exemplary embodiment, the selection of the division factor pattern is performed between a pair of division factors, including a first division factor and a second division factor, wherein the first division factor may be smaller in value than the second division factor. In this embodiment, the highest achievable throughput frequency is a ratio between a root frequency and the first division factor. In an exemplary embodiment, it may be assumed that a first counter from among the plurality of counters 222 is configured to count the selection of the first division factor, and the count value is $N_0$ at an instance when the number of cycles of the first clock signal 206 is $N_1$. Further, the value of $N_1$ may be scaled by a scaling factor k (for example, ½), and an absolute value of an expression ($N_0-K*N_1$) may be determined. In the present embodiment, a selection of the predetermined criterion may include determining whether an absolute value of the expression $(N-K*N_1)$ is less than or equal to a constant 'T'. The factor T may be a positive integer. In an exemplary embodiment, the factor T is five. Upon a determination that the value of expression exceeds five, the predetermined threshold is adjusted so as to select the first division factor such that the first division factor is less than the second division factor. Upon a determination that the value is below minus 5 (−5), the predetermined threshold is adjusted so as to make less frequent selection of the second division factor. For example, if suppose k=½, then if the value is zero, it would mean that $N_0=½ N_1$. If $N_0=½N_1$, for every $N_1$ clock edges of the first clock signal, the first division factor is selected $N_1/2$ times, ensuring a 50% bias, such that the first and the second division factors are selected equal number of times within the $N_1$ clock cycles.

In another embodiment, the factor T is computed as $T=N_0-K*N_1$, where $N_0$ is the count value for the number of selections of a division factor corresponding to a highest operational frequency $f_h$ and $N_1$ is the number of cycles of the first clock signal 206. In an embodiment, abs(T) is maintained within a range, for example, 0 to 5 so as to achieve a throughput frequency computed as $f_{root}/[K*M_0+(1-K)*M_1]$, where $f_{root}$ is the root frequency of the second clock signal, where $M_o$ corresponds to the division factor for frequency $f_h$ and $M_1$ corresponds to division factor for a frequency f. For example, if k=0.5 and $M_0$=6 and $M_1$=7 and $f_{root}$ is 800 MHz, then the throughput is 800/6.5, that is 123 MHz and if $N_1$ is 1000 clock cycles, $N_0$ is 500. Similarly, if k=⅓, the throughput is 120. In an embodiment, if value of T is negative then the threshold is reduced such that the division factor corresponding to $f_h$ is selected more frequently and if value of T is positive then the threshold is increased such that the division factor corresponding to $f_h$ is selected less frequently. The threshold is adjusted so as to maintain $N_0$ as close to $k*N_1$ as possible. For example, if T is −1, $N_0$ is less than $k*N_1$ and the threshold is adjusted so as to increase N0 subsequently such that the division factor corresponding to $f_h$ is selected more frequently. Similarly if T is 1, $N_0$ is more than $k*N_1$ and the threshold is adjusted so as to decrease $N_0$ subsequently such that the division factor corresponding to $f_h$ is selected less frequently.

Figure 3A:
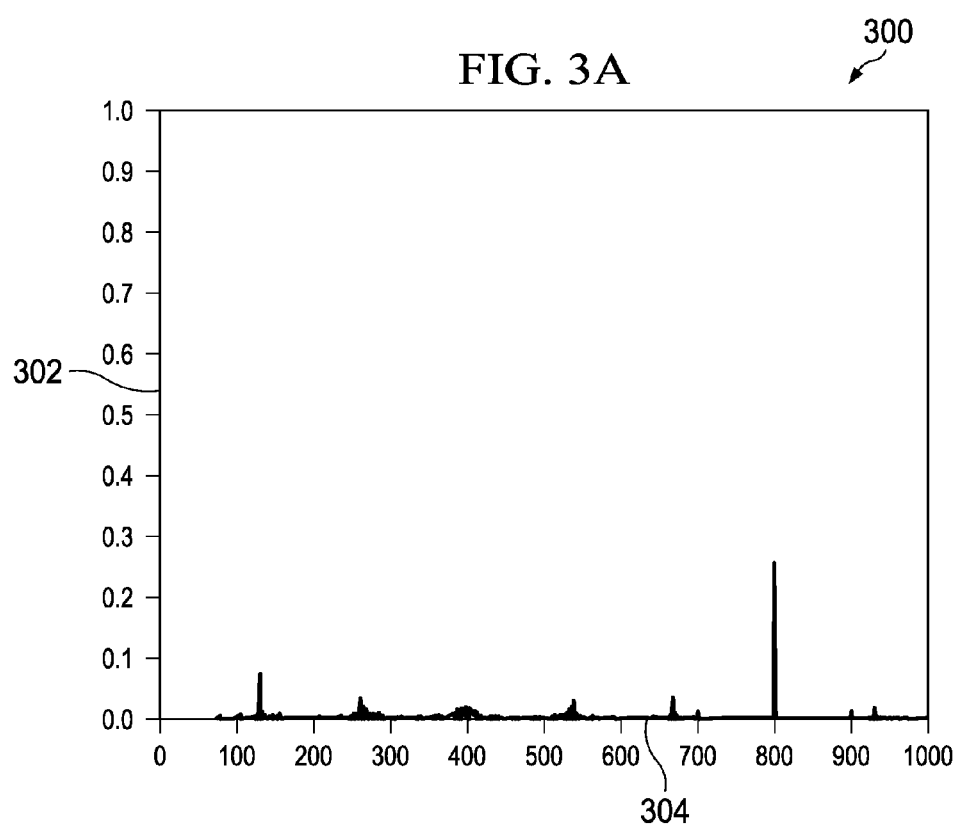
FIGS. 3A and 3B illustrate various exemplary frequency profiles, respectively, of the signal interference mitigation circuit of FIG. 2 in accordance with an embodiment.

FIG. 3A is an exemplary frequency profile plot 300 for the first clock signal 206 generated by the signal interference mitigation circuit 200 of FIG. 2, based on the random selection of division factors 6 and 7 for a second clock signal of 800 MHz, in accordance with an embodiment. The exemplary frequency profile plot 300 is a plot of normalized power along y-axis 302 and frequency (measured in MHz) along x-axis 304. As may be observed in FIG. 3A, several lower frequency components below 800 MHz are flat, and a spike may be observed at 800 MHz, which is indicative of spurs being suppressed at frequencies below 800 MHz. The operational frequencies may be 800 MHz/6 (that is 133 MHz) and 800 MHz/7 (that is 114 MHz). FIG. 3A is also indicative of the spurs being suppressed at the operational frequencies 133 MHz and 114 MHz as well as at the corresponding harmonics. The spurs get suppressed at the operational and other frequencies below 800 MHz due to non-periodic or random selection of the division factors 6 and 7. The sequence of random selection may be, for example, 6,7,7,7,6,6,7,7,6,6,6, 7,7,7, and 7.

Figure 3B:
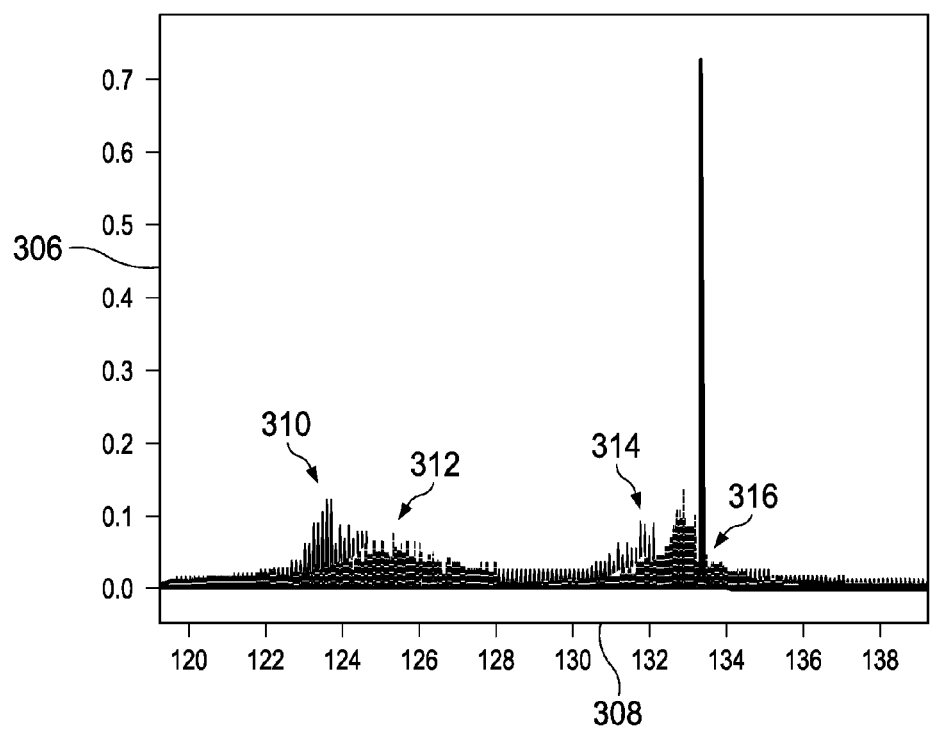

FIG. 3B depicts various exemplary frequency profile plots for different biases for random selection of division factors in the signal interference mitigation circuit 200 of FIG. 2 in accordance with an embodiment. More specifically, FIG. 3B depicts a plot of normalized power along y-axis 306 and frequency along x-axis 308. As illustrated, for a bias of 50%, the division factors may be selected with an equal probability of selection. For example, for the bias of 50%, the number of times that a division factor of, for example, 6 and a division factor of, for example, 7 is selected for a second clock signal of 800 MHz may be the same, thereby causing the throughput frequency to be an average of 133 MHz and 114 MHz (which is equal to 123 MHz, as explained by an earlier example herein with reference to FIG. 2). Upon choosing a bias of 90%, the throughput frequency tends to be closer to 133 MHz for random selection of the division factor 6 and the division factor 7.

Figure 3C:
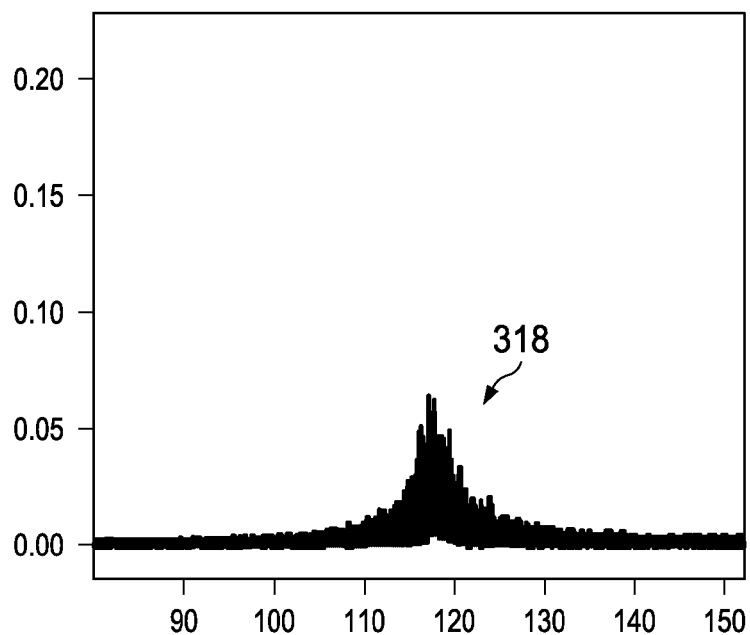
FIGS. 3C-3E depict various exemplary frequency profiles corresponding to various biases, respectively, for random selection of division factors in accordance with an embodiment.
Figure 3D:
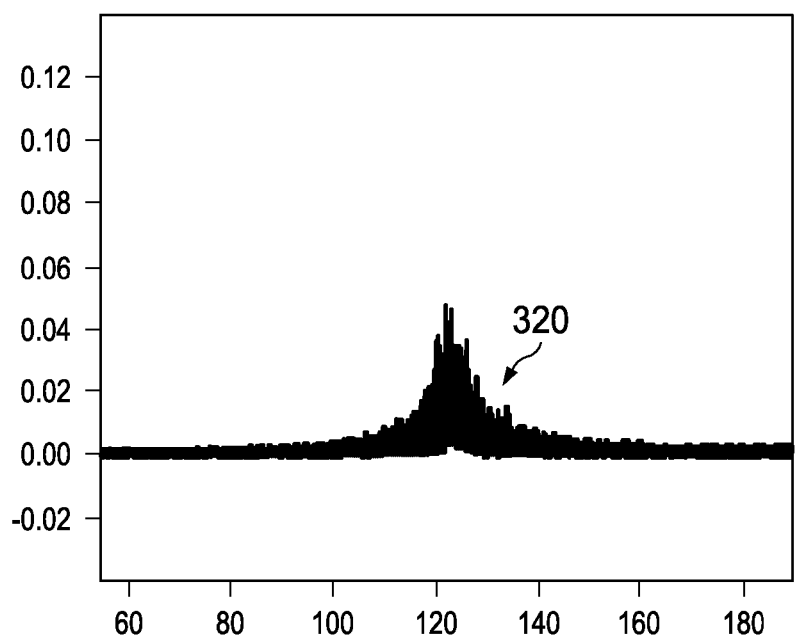
Figure 3E:
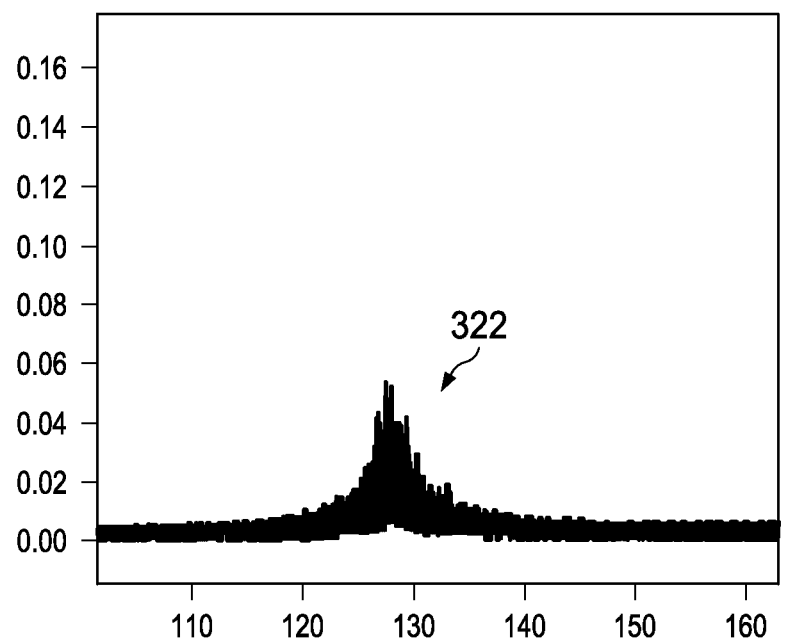

As depicted in FIG. 3B, a plot 310 is obtained by selecting a bias of 50%, thereby causing a 50% probability of the selection of division factor 6 and a 50% probability of the selection of division factor 7. Also, a plot 312 is obtained by selecting a bias of 70%, thereby causing a 70% probability of selection of division factor 6 and 30% probability of selection of division factor 7. Additionally, a plot 314 is obtained by selecting a bias of 90%, thereby causing a 90% probability of a selection of division factor 6 and a 10% probability of a selection of division factor 7. A plot 316 is an ideal plot for obtaining a throughput frequency of 133 MHz. FIGS. 3C-3E individually depict frequency profiles corresponding to various biases for random selection of the division factors 6 and 7 in accordance with an embodiment.

As depicted in FIGS. 3C-3E, a plot 318 corresponds to a bias of 25%, a plot 320 corresponds to a bias of 50% and a plot 322 corresponds to a bias of 75%, each for random selection of the division factors 6 and 7 as in the exemplary scenario explained earlier herein with reference to FIGS. 3A and 3B. It may be observed from the plots 318 and 320 that the peak moves closer to 133 MHz in the plot 320, as the bias for division factor 6 is increased from 25% to 50%. Upon selecting various biases for a preselected throughput frequency, an embodiment of the present technology enables the spreading of energy to multiple frequencies, thereby suppressing the occurrence of spurs at frequencies below the root frequency (for example, 800 MHz in the example explained herein with reference to FIG. 2). The spikes may be present at the root frequency and at the harmonics of the root frequency.

Figure 4:
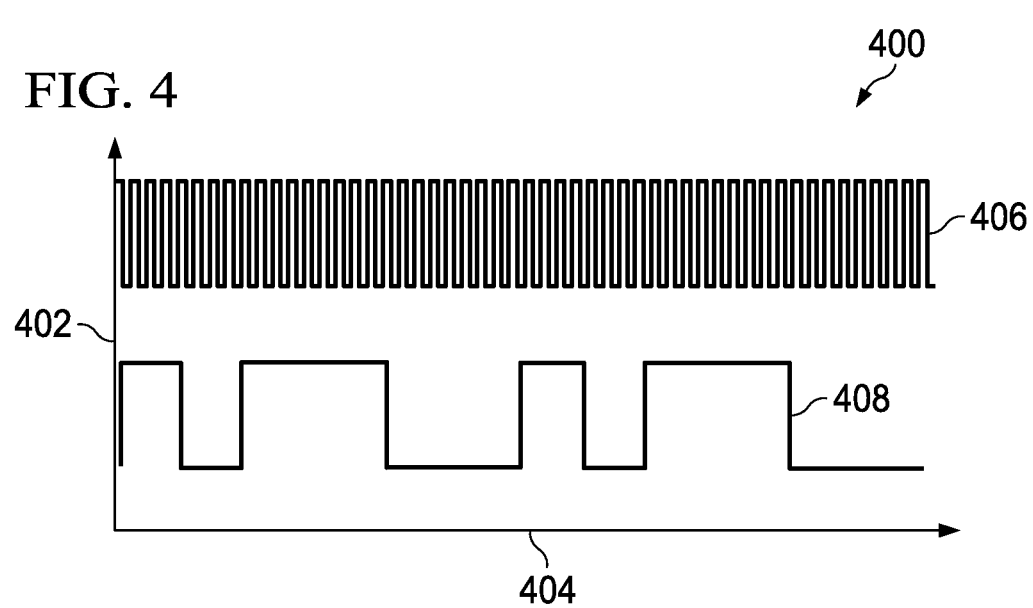
FIG. 4 depicts exemplary waveforms associated with the signal interference mitigation circuit of FIG. 2 in accordance with an embodiment.

FIG. 4 illustrates exemplary waveforms 400 associated with the signal interference mitigation circuit 200 of FIG. 2 in accordance with an embodiment. The exemplary waveforms are plotted with signal amplitude along y-axis 402 and time along x-axis 404. More particularly, FIG. 4 depicts a second clock signal 406 of root frequency used to generate an output signal 408 based on the signal interference mitigation circuit 200 by employing the random selection of a division factor pattern comprising a plurality of division factors. As may be observed from FIG. 4, the output signal 408 changes nearly instantaneously from a first frequency to a second frequency immediately after a clock cycle with the first frequency, thereby indicating that the signal interference mitigation circuit 200 of FIG. 2 enables a nearly instantaneous change in frequency of the output signal 408. The nearly instantaneous change in frequency of the output signal 408 of the signal interference mitigation circuit 200 may be advantageous in several application scenarios.

Figure 5:
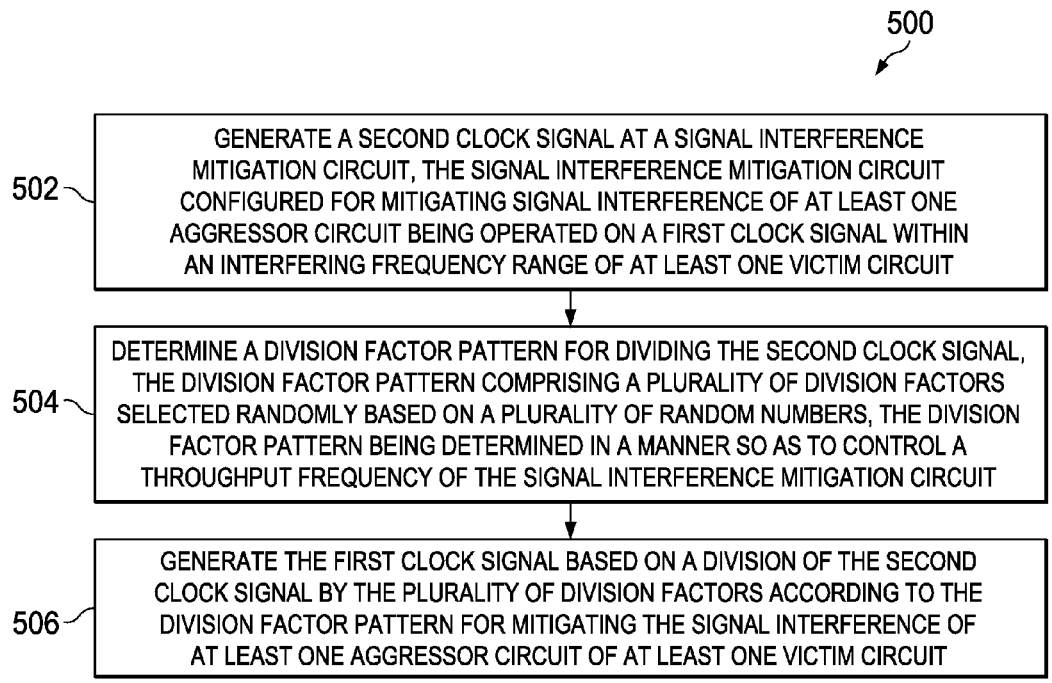
FIG. 5 illustrates a flow diagram of an exemplary method of mitigating signal interference in an IC in accordance with an embodiment.

FIG. 5 illustrates a flow diagram of a method 500 of mitigating signal interference of at least one aggressor circuit in an IC in accordance with an embodiment. The at least one aggressor circuit is capable of being operated on a clock signal in the IC within an interfering frequency range of at least one victim circuit in the IC. For purposes of illustration, the detailed description refers to at least one aggressor circuit and at least one victim circuit; however, it is noted that various embodiments of the present technology involve implementations in scenarios involving a single aggressor circuit and a single victim circuit in the IC. Examples of the aggressor circuit include, but are not limited to, a global positioning system circuit, a frequency modulation circuit, a short range wireless communications circuit, a wireless local area network circuit, and a near field communication circuit. Examples of the victim circuit include, but is not limited to, a global positioning system circuit, a frequency modulation circuit, a short range wireless communications circuit, a wireless local area network circuit, and a near field communication circuit.

In an embodiment, the method 500 may be performed using the signal interference mitigation circuit 200 of FIG. 2. In an embodiment, the signal interference mitigation circuit 200 is configured to be communicatively coupled or associated with the aggressor circuit. In an embodiment, at operation 502, a second clock is provided. In an embodiment, the second clock is a high-frequency clock. In an embodiment, the second clock signal is provided to a counter. An example of the may be the counter 210 (see, e.g., FIG. 2).

At operation 504, a division factor pattern is determined in order to divide the second clock signal. In an embodiment, the division factor pattern includes a plurality of division factors selected randomly based on a plurality of random numbers. In an embodiment, the plurality of random numbers may be generated by a random number generator, such as, for example, the random number generator 216 (see, e.g., FIG. 2). In an embodiment, the division factor pattern is determined in a manner so as to control a throughput frequency associated with the signal interference mitigation circuit. It is noted that the term in "throughput frequency" may be construed, for example, as referring to a minimum clock rate of the first clock signal that is to be provided to an aggressor circuit over a specific time interval based on a parameter associated with an aggressor circuit.

In an embodiment, the random number generator may be actuated by the first clock signal such that each of the plurality of random numbers is updated at a clock edge of the first clock signal. The generated random number may be compared with a predetermined threshold. In an embodiment, the predetermined threshold is initially set by firmware. In an embodiment, the selection of the division factor from among the plurality of division factors is determined based on the comparison and the corresponding selection generated as explained herein with reference to FIG. 2. In an embodiment, the division factor is selected randomly such that the random selection is biased based on a throughput frequency associated with the signal interference mitigation circuit. In an embodiment, a frequency of occurrence of each division factor from among the plurality of division factors is determined based on the comparison.

In an embodiment, a number of selections of each of the plurality of division factors are tracked by the control circuit. The tracked number of selection of each of the plurality of division factors is compared based on a predetermined criterion. In an embodiment, the number of selection of each of the plurality of division factors is counted by a plurality of counter circuits, such as the plurality of counter circuits 222 of FIG. 2. Each of the plurality of counter circuits corresponds to one of the plurality of division factors, and each of the plurality of counter circuits is configured to count a selection of the corresponding one of the plurality of division factors. In an embodiment, the predetermined criterion is associated with a throughput frequency of the signal interference mitigation circuit. In an embodiment, the predetermined threshold that is initially set by the firmware is either increased, decreased, or maintained unaltered based on the comparison, such that the division factor selected based on the predetermined threshold enables the maintaining of the throughput frequency of the signal interference mitigation circuit. The number of selection of each of the plurality of division factors may be regulated based on a bias adjustment. As used herein, the term "bias" is construed as referring to a probability in terms of percentage of selecting one or more division factors at a particular instant during the clock cycles of the first clock signal generated through the signal interference mitigation circuit. For example, a 50 percent bias for selection of division factors 6 and 7 would indicate that the number of times that division factor 6 is selected is equal to the number of times that the division factor 7 is to be selected. The bias enables the controlling of the randomness in the selection of the division factors so as to achieve a preselected throughput frequency.

In an exemplary embodiment, the division factor pattern may be determined by a control circuit communicatively coupled or associated with the at least one aggressor circuit. An example of the control circuit may include the control circuit 204 (see, e.g., FIG. 2). In an embodiment, a selection signal indicative of a selection of a division factor from among the plurality of division factors associated with the division factor pattern may be generated. In an embodiment, a first clock signal generated based on a division of the second clock signal by the plurality of division factors according to the division factor pattern facilities a suppressing of the spur signal associated with the first clock signal at one or more operational frequencies associated with the aggressor circuit.

At operation 506, the first clock signal is generated by a signal interference mitigation circuit, such as the signal interference mitigation circuit 200 of FIG. 2, based on the second clock signal and the division factor pattern. Each of the plurality of division factors associated with the division factor pattern may include a positive integer.

Figure 6:
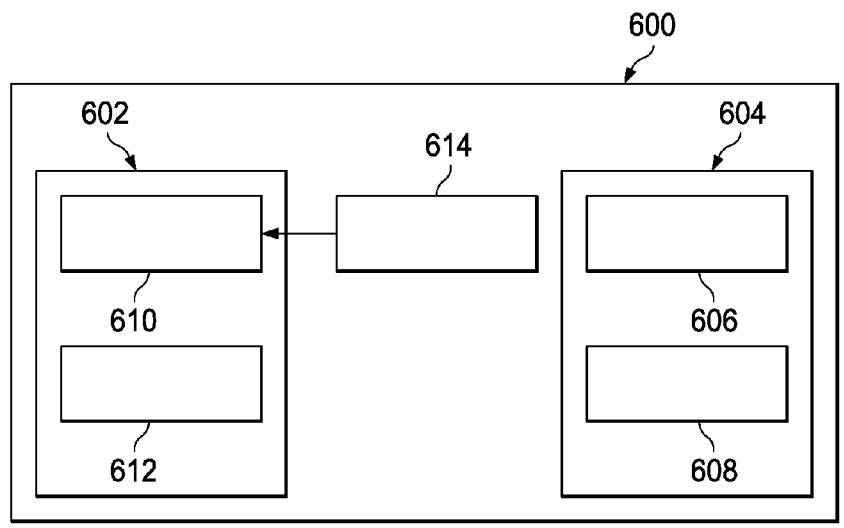
FIG. 6 illustrates a block diagram of an IC configured to mitigate signal interferences within aggressor blocks and victim blocks of the IC in accordance with an embodiment.

FIG. 6 illustrates a block diagram of an IC 600, such as, for example, a multiple radio system on chip (SoC), configured to implement various embodiments of the present technology. In an embodiment, the multiple radio SoC, hereinafter referred to as "SoC", includes a chip device that combines functionalities of various communication protocols together with their corresponding radio frequency (RF) circuits, such as, for example, GPS, short range wireless communications and frequency modulation (FM) receivers or transmitters. The IC includes a first circuit 602, for example a GPS circuit and a second circuit 604, for example a FM circuit. The first circuit 602 is capable of being operated on a clock signal within an interfering frequency range of the second circuit 604. In an embodiment, the second circuit 604 may include a second digital circuit 606, for example, a FM digital circuit and/or a second radio frequency (RF) circuit 608, for example, a FM RF circuit. The first circuit 602 includes a first digital circuit 610, for example a GPS digital circuit and a first RF circuit 612, for example a GPS RF circuit. In several embodiments, the first digital circuit 610 generates a spur signal due to digital noise signals and serves as an aggressor circuit. The second RF circuit 608 serves as a victim circuit, such that the spur signal generated by the aggressor circuit lies in a frequency range of operation of the second RF circuit 608. In the present embodiment, a GPS circuit, such as, for example, the first digital circuit 610, is assumed to be an example of the aggressor circuit and a FM circuit, such as, for example, when the second RF circuit 608 is assumed to be an example of the victim circuit. However, the methods and systems disclosed herein may be implemented with reference to other aggressor circuits and victim circuits. Examples of the aggressor circuit and/or victim circuit includes, but are not limited to, a short range wireless communications circuit, a wireless local area network circuit, a global positioning system circuit, a frequency modulation circuit, and a near field communication circuit.

The victim circuit is capable of transmitting a frequency modulated signal in the transmission mode or demodulating a frequency modulated signal in the reception mode. In an embodiment, the FM RF range of operation is 76-108 MHz. The first digital circuit 610 may be operational at a frequency of 32 MHz. A third harmonic of 32 MHz, that is 96 MHz, may act as an aggressor to the second RF circuit 608 as the frequency range of operation of victim circuit is 76-108 MHz, thereby leading to co-existence issues between the first digital circuit 610 and the second RF circuit 608. In an embodiment, co-existence issues are mitigated using a signal interference mitigation circuit 614 that is communicatively coupled or associated with the first digital circuit 610. The signal interference mitigation circuit 614 is substantially similar to the signal interference mitigation circuit 200 of FIG. 2. The signal interference mitigation circuit 200 is configured to perform functions explained herein with reference to FIG. 2, which are not repeated herein for the sake of brevity. It is noted that the present disclosure is explained using the GPS and FM circuits. However, similar structure and functioning is applicable to any two circuits that interfere with each other in the frequency range of operation in the IC.

Without in any way limiting the scope, interpretation, or application of the claims appearing below, advantages of one or more of the exemplary embodiments disclosed herein is to generate a co-existence of friendly clock signals for different blocks in an IC. Various embodiments of the present technology enable the suppression of spikes at an operational frequency. Various embodiments of the present technology enable a random selection of division factors and do not use a multiplexer to switch the clock frequencies, but rather generate divided clock signals of different frequencies based on the selected division factor and a second clock signal. Also, various embodiments of the present technology enable instantaneous (or near instantaneous) clock switching based on the high frequency clock. In various exemplary techniques for mitigating co-existence issues due to interference, in order to suppress the spikes at frequencies below a root frequency (for example, 800 MHz) associated with the second clock signal, the system is to have a synthesis or operational frequency that is the same as the root frequency. However, by using various embodiments of the present technology, the spikes at frequencies below the root frequency may be suppressed while maintaining a synthesis frequency of a value that is less than the root frequency (for example, 133 MHz or 114 MHz). Additionally, various embodiments of the present technology enable the controlling of a throughput frequency based on a biased random selection of the division factors, thereby enabling designs with narrower throughput margins to utilize various embodiments of the present technology. Moreover, various embodiments of the present technology provide a completely digital solution to interference issues arising in the IC and are hence process, temperature, and/or voltage independent. Also, various embodiments of the present technology enable an on the fly update of the division pattern for a preselected dynamism in the interfering spectrum location in multi-radio SOCs, and the methodology of various embodiments of the present technology is scalable.

It should be noted that reference throughout this specification to features, advantages, or similar language does not imply that all of the features and advantages should be, or are in, any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions are apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims

What is claimed is:

1. A signal interference mitigation circuit comprising:
a clock divider circuit configured to generate a first clock signal based on a second clock signal and a division factor pattern, wherein the clock divider circuit comprises:
a multiplexer circuit configured to receive a selection signal from the control circuit and provide a selection of a division factor based on the division factor pattern and the selection signal;
a counter configured to receive the selection of the division factor and generate the second clock signal indicative of a count value;
a first comparator circuit coupled with the counter and the multiplexer circuit, the first comparator circuit configured to compare the selection of the division factor with the count value of the counter at the rate of the generated second clock signal and generate a trigger signal based on the comparison; and
a flip-flop circuit coupled with the first comparator circuit and configured to receive the trigger signal and generate the first clock signal based on the division factor pattern; and
a control circuit coupled with the clock divider circuit, the control circuit configured to:
determine the division factor pattern, the division factor pattern comprising a plurality of division factors selected randomly based on a plurality of random numbers, and the division factor pattern being determined in a manner so as to control a throughput frequency associated with the signal interference mitigation circuit, and
provide the division factor pattern to the clock divider circuit.

2. The circuit of claim 1, wherein the control circuit comprises:
a random number generator circuit clocked by the generated first clock signal and configured to generate a random number;
a second comparator circuit communicatively associated with the random number generator circuit and configured to compare the random number with a predetermined threshold to generate the selection signal based on the comparison; and a register communicatively associated with the second comparator circuit and configured to store a value of the predetermined threshold.

3. The circuit of claim 2, wherein the control circuit further comprises:
a plurality of counter circuits communicatively associated with the second comparator circuit, each of the plurality of counter circuits corresponding to one of the plurality of division factors, and the plurality of counter circuits configured to receive the selection signal and to count a selection of the corresponding one of the plurality of division factors; and
a third comparator circuit communicatively associated with the plurality of counter circuits and the register and configured to compare a plurality of counts associated with the plurality of counter circuits based on a predetermined criterion so as to adjust the predetermined threshold in the register based on the comparison, the predetermined criterion being associated with the throughput frequency of the signal interference mitigation circuit.

4. The circuit of claim 2, wherein the random number generator circuit is a linear feedback shift register.

5. An integrated circuit configured to mitigate signal interference, the integrated circuit comprising
a victim circuit operating in a predetermined frequency range;
an aggressor circuit coupled with the victim circuit and capable of being operated on a first clock signal within the predetermined frequency range of the victim circuit; and
a signal interference mitigation circuit coupled with the aggressor circuit, the signal interference mitigation circuit comprising:
a clock divider circuit configured to generate the first clock signal based on a division factor pattern and a second clock signal, wherein the clock divider circuit comprises:
a multiplexer circuit configured to receive a selection signal from the control circuit and to provide a selection of a division factor based on the division factor pattern and the selection signal;
a counter configured to receive the selection of the division factor and to generate the second clock signal indicative of a count value;
a first comparator circuit communicatively associated with the counter and the multiplexer circuit, the first comparator circuit configured to compare the selection of the division factor with the count value of the counter at the rate of the generated second clock signal and generate a trigger signal based on the comparison; and
a flip-flop circuit communicatively associated with the comparator circuit and configured to receive the trigger signal and generate the first clock signal based on the division factor pattern; and
a control circuit coupled with the clock divider circuit, the control circuit configured to:
determine the division factor pattern, the division factor pattern comprising a plurality of division factors selected randomly based on a plurality of random numbers, and the division factor pattern being determined in a manner so as to control a throughput frequency associated with the signal interference mitigation circuit, and
provide the division factor pattern to the clock divider circuit.

6. The integrated circuit of claim 5, wherein the control circuit comprises:
a random number generator circuit clocked by the generated first clock signal and configured to generate a random number;
a second comparator circuit communicatively associated with the random number generator circuit and configured to compare the random number with a predetermined threshold to generate the selection signal based on the comparison; and
a register communicatively associated with the second comparator circuit configured to store a value of the predetermined threshold.

7. The integrated circuit of claim 6, wherein the control circuit further comprises:
a plurality of counter circuits communicatively associated with the second comparator circuit, each of the plurality of counter circuits corresponding to one of the plurality of division factors, and the plurality of counter circuits configured to receive the selection signal and to count a selection of the corresponding one of the plurality of division factors; and
a third comparator circuit communicatively associated with the plurality of counter circuits and the register and configured to compare a plurality of counts associated with the plurality of counter circuits based on a predetermined criterion so as to adjust the predetermined threshold in the register based on the comparison, the predetermined criterion being associated with the throughput frequency of the signal interference mitigation circuit.

8. The integrated circuit of claim 6, wherein the random number generator circuit is a linear feedback shift register.

9. A method for mitigating signal interference of at least one aggressor circuit, the at least one aggressor circuit capable of being operated on a first clock signal in an Integrated Circuit (IC) within an interfering frequency range of at least one victim circuit in the IC, the method at a signal interference mitigation circuit comprising:
generating a second clock signal;
determining a division factor pattern for dividing the second clock signal, the division factor pattern comprising a plurality of division factors selected randomly based on a plurality of random numbers, the division factor pattern being determined in a manner so as to control a throughput frequency of the signal interference mitigation circuit, wherein determining the division factor pattern comprises:
generating a plurality of random numbers, by a random number generator, the random number generator being actuated by the first clock signal, wherein each of the plurality of random numbers are updated at a clock edge of the first clock signal;
comparing the generated random number with a predetermined threshold; and
determining a frequency of occurrence of each division factor from among the plurality of division factors based on comparison; and
generating the first clock signal based on a division of the second clock signal by the plurality of division factors according to the division factor pattern.

10. The method of claim 9, further comprising:
tracking a number of selection of each of the plurality of division factors;
comparing the tracked number of selection of each of the plurality of division factors based on a predetermined criterion, the predetermined criterion being associated with the throughput frequency; and performing increasing or decreasing of the predetermined threshold based on the comparison for controlling the throughput frequency.

11. The method of claim 10, wherein tracking comprises:
counting the number of selection of each of the plurality of division factors by a plurality of counter circuits, such that each of the plurality of counter circuits corresponds to one of the plurality of division factors and each of the plurality of counter circuits is configured to count a selection of the corresponding one of the plurality of division factors.

12. A method for mitigating signal interference of at least one aggressor circuit, the at least one aggressor circuit capable of being operated on a first clock signal in an Integrated Circuit (IC) within an interfering frequency range of at least one victim circuit in the IC, the method at a signal interference mitigation circuit comprising:

generating a second clock signal;

determining a division factor pattern for dividing the second clock signal, the division factor pattern comprising a plurality of division factors selected randomly based on a plurality of random numbers, the division factor pattern being determined in a manner so as to control a throughput frequency of the signal interference mitigation circuit;

generating the first clock signal based on a division of the second clock signal by the plurality of division factors according to the division factor pattern; and generating a selection signal indicative of a selection of a division factor from among the plurality of division factors associated with the division factor pattern.

13. The method of claim 9, wherein the random number generator circuit is a linear feedback shift register.

* * * * *